Sept. 20, 1932.   H. N. DAULER   1,878,267
CRACKING RESINS AND LIKE MATERIALS
Filed Feb. 4, 1932
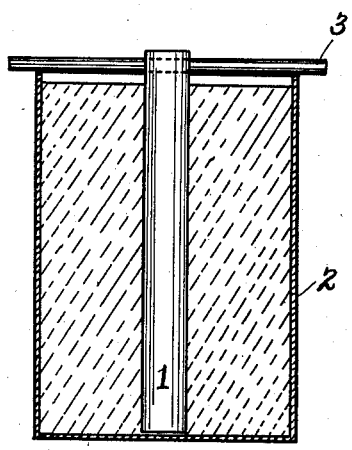
Fig. I
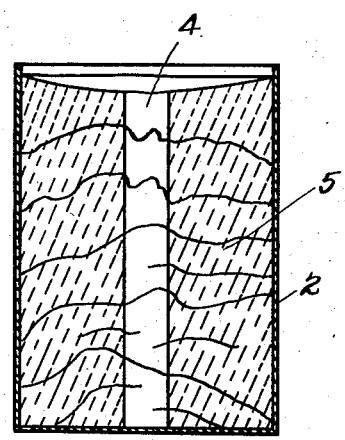
Fig. II
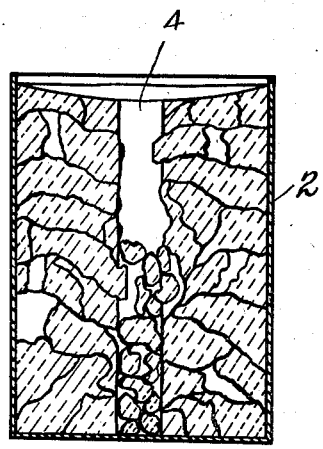
Fig. III
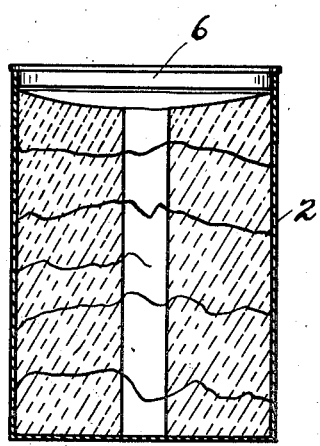
Fig. IV
INVENTOR
Harvey N. Dauler
by Christy Christy & Wharton
his attorneys Patented Sept. 20, 1932

1,878,267

UNITED STATES PATENT OFFICE

HARVEY N. DAULER, OF PITTSBURGH, PENNSYLVANIA

CRACKING RESINS AND LIKE MATERIALS

Application filed February 4, 1932. Serial No. 590,908.

This invention relates to a method of cracking solid resins into small, usable, fragments.

In order that they may be used for most purposes, such as incorporation in paint and varnish, resins of synthetic production, as for example coumarone, phenol, formaldehyde, and glyceral phthalate resins or ester gums are in some manner divided into relatively small fragments prior to use.

If, a synthetic resin, as for example coumarone resin, while in liquid state, is run or poured directly into a drum or similar container from a kettle, retort, or still, great difficulty has been heretofore experienced in breaking up the solid cylinder of resin so formed, after the resin has solidified. This is for the reason that subsequent hammering on the exterior surface of a thin-walled container, such as a steel drum, wooden barrel or composition package merely produces cracks in the solid mass of resin contained therein, without definitely dividing the resin into relatively small particles. The severity of the hammering necessary in order to even crack the resin also results in injury to the package or container. It is difficult to remove the body of resin, either as a single mass or in large fragments from the container. Even if so removed subsequent fragmentation to desired lump size presents difficulties.

Heretofore two methods of preparing resin for use have been employed, both of which methods must be pursued closely adjacent the still from which the resin is withdrawn.

One such previously employed method is to introduce the resin in fluid condition, from the still into a number of relatively shallow pans, so that it hardens in relatively thin cakes. These cakes after solidification can be readily broken up to a small lump size. The pans used, however, necessarily comprise a relatively great area for reception of the liquid or viscous resin, and expose a large area of the material to light and air. Whether the pans be large or small, the handling of them is laborious. It is usual to use relatively large pans arranged in a rack, in order to conserve floor space in or adjacent the still room. If a variety of resins are made in the same plant, a relatively great number of pans is necessary in order to prevent contamination of the resin of the several sorts or types. This rack is cumbersome, the cooling in the trays is relatively slow, and the trays are subject to warping under the high temperatures employed. Breaking up the material when in the form of cakes in the pans causes dusting, with consequent loss or contamination of the material.

Another method of dividing the resin is to subject it in viscous condition to a flaking operation on a rotating cylinder, from which the resin is scraped, as it solidifies, in a relatively thin sheet or film. A great disadvantage of this method is that an entire still run of resin must be maintained in a fluid condition, in a still or other appropriate vessel, during the continuance of the flaking operation. The flaking operation is slow and the resin must therefore be drawn off from time to time over a relatively long period. Furthermore the actual flaking operation is very difficult if not impractical as applied to the harder, higher melting point, resins.

Both methods above described tend to promote oxidation of certain resins, by exposing the resin in small particles to the full effect of light and air.

The object of my invention is to provide a method whereby a resin or the like, may be introduced in quantity from a still into portable containers of relatively great volume, the resin being caused to so solidify within the containers that it may be readily broken up after solidification without removal from the container.

In the accompanying drawing, exemplary of my method, Figure I is a vertical sectional view showing a thin-walled container with a filler core in position therein and showing a frangible gummy material, such as resin, in the container and surrounding the filler core; Figure II is a vertical sectional view illustrating the condition of the material in the container after it has solidified and the filler core has been withdrawn; Figure III is a vertical sectional view through the container, illustrating the manner in which the frangible gummy material therein may be broken up after withdrawal of the filler core therefrom; and Figure IV is a vertical sectional view showing a container of the frangible gummy material, with the filler core withdrawn and the container sealed for shipment.

In accordance with my method a filler core 1 is positioned to extend into a container, desirably a thin-walled container such as the drum 2. As shown, the filler core is provided with a cross member, or handle, 3, by means of which it may be positioned in the container and withdrawn therefrom. In pursuing the method on a commercial scale I provide a number of containers with filler cores. The resin is then withdrawn from the still, and while at a temperature of fluidity, is run or poured into the several containers. These containers may be set apart in any convenient location for solidification of the contents by cooling. As the material cools it hardens around the filler core, which remains in position until the resin has solidified completely.

After solidification of the resin, the filler core is withdrawn from the drum, this withdrawal causing a cavity 4 in the body 5 of the material. An auxiliary consequence of the withdrawal of the filler core is a general cracking of the resin in the drum. After withdrawing the filler core from the body of the material certain further steps may be alternatively employed. For example I may subdivide the material immediately in the container by means of repeated percussion on the exterior surface of the container, as by striking it with a maul. Under this percussion relatively small fragments of resin, being detached from the main body, are received by the internal cavity 4. This action, as will be seen by reference to Figure III of the drawing, leaves space unoccupied, or loosely occupied, by fragments of resin into which space further additional fragments may lodge as the percussive action is continued.

Less desirably, the resin may be loosened in the container by striking the container wall or walls, and removed in relatively large fragments for subdivision outside the container.

A further alternative step is to seal the drum, or other suitable container, for shipment, as by means of a friction lid, or head, 6. As so sealed and shipped the resin is subdivided effectively by the jarring incident to shipment. If, however, it is desired to still further subdivide the resin upon arrival at its destination, it may be there subjected to a percussive action on the exterior surface of the drum. Obviously, a filler core may be permitted to remain in position during shipment, and withdrawn for subdivision of the material in the location of its use.

It should be understood that the filler core may be of any cross-sectional contour, and of relatively small cross-sectional area with respect to the cross-sectional area of the drum. For example, I have successfully used a filler core of two-inch diameter in a drum of two-foot diameter.

My method involves not only convenience in subdivision of the material, but is also valuable in avoiding waste, deterioration and contamination of resins, rosin, and like materials. Since the subdivision of the material may be effected in the container, there is no waste of material, by dusting during breakage. There is also no exposure either of a broad sheet or cake of the material, or of small particles thereof, to the oxidizing effect of light and air.

While I have described my method with particular reference to synthetic resins, it will be understood that identically the same method may be employed in connection with other frangible gummy materials, as for example pitch, or rosin.

I claim as my invention:

1. The herein described steps in a method of dividing frangible gummy material which comprises positioning a filler core to extend into a container, introducing the material at a temperature of fluidity into the container to surround the filler core therein, cooling the material with the filler core in the body of material thus causing solidification of the material around the filler core, and causing a cavity in the body of material together with initial cracking thereof by withdrawal of the filler core after solidification of the material.

2. The herein described method of dividing frangible gummy material which comprises positioning a filler core to extend into a container, introducing the material at a temperature of fluidity into the container to surround the filler core therein, cooling the material with the filler core in the body of material thus causing solidification of the material around the filler core, causing a cavity in the body of material by withdrawing the filler core after solidification of the material, and dividing the body of material by percussion on the outer surface of the container with initial reception of detached fragments of the material in the preformed cavity in the body of material.

3. The herein described method of dividing frangible gummy material which comprises positioning a filler core to extend into a container, introducing the material at a temperature of fluidity into the container, cooling the material with the filler core in the body of material thus causing solidification of the material around the filler core, causing a cavity in the body of material by withdrawing the filler, sealing the container, and subjecting the container exteriorly to repeated percussion.

In testimony whereof I have hereunto set my hand.

HARVEY N. DAULER.